United States Patent
Abraham

(10) Patent No.: US 10,680,831 B2
(45) Date of Patent: Jun. 9, 2020

(54) SINGLE POINT OF MANAGEMENT FOR MULTI-CLOUD ENVIRONMENT INCLUDING ROUTE PROPAGATION, SECURITY, AND APPLICATION DEPLOYMENT

(71) Applicant: Juniper Networks, Inc., Sunnyvale, CA (US)

(72) Inventor: Sanju C. Abraham, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/144,711

(22) Filed: Sep. 27, 2018

(65) Prior Publication Data

US 2020/0059370 A1 Feb. 20, 2020

Related U.S. Application Data

(60) Provisional application No. 62/718,765, filed on Aug. 14, 2018.

(51) Int. Cl.
| | |
|---|---|
| H04L 29/06 | (2006.01) |
| H04L 9/32 | (2006.01) |
| H04L 12/46 | (2006.01) |
| H04L 12/66 | (2006.01) |
| H04L 29/08 | (2006.01) |

(52) U.S. Cl.
CPC ........ H04L 9/3263 (2013.01); H04L 12/4633 (2013.01); H04L 12/66 (2013.01); H04L 67/10 (2013.01)

(58) Field of Classification Search
USPC ........................................................ 713/175
See application file for complete search history.

(56) References Cited

U.S. PATENT DOCUMENTS 9,226,333 B2 * 12/2015 Steiner ................ G06F 9/45558
9,571,394 B1    2/2017 Sivaramakrishnan
(Continued)

FOREIGN PATENT DOCUMENTS

| EP | 3264691 A1 | 1/2018 |
|---|---|---|
| WO | 2013184846 A1 | 12/2013 |

OTHER PUBLICATIONS

U.S. Appl. No. 16/145,800, by Juniper Networks, Inc. (Inventors: Sanju C. Abraham), filed Sep. 28, 2018.
(Continued)

*Primary Examiner* — Amare F Tabor
(74) *Attorney, Agent, or Firm* — Shumaker & Sieffert, P.A.

(57) ABSTRACT

In general, the disclosure describes examples where a single software-defined network (SDN) controller establishes tunnels and controls communication on these tunnels between a plurality of virtual computing environments (VCEs). The SDN controller establishes the logical tunnel mesh to interconnect the plurality of VCEs in the multi-cloud network via respective connect gateway routers. To establish the logical tunnel mesh, the SDN controller is configured to determine one or more logical tunnels from the logical tunnel mesh to establish one or more communication links between a first VCE and a second VCE of the plurality of VCEs in the multi-cloud network. The SDN controller is configured to advertise the one or more logical tunnels to the first VCE and the second VCE.

20 Claims, 15 Drawing Sheets

(56) References Cited

U.S. PATENT DOCUMENTS

| | | | |
|---|---|---|---|
| 10,180,809 B2* | 1/2019 | Fetik | G06F 3/0653 |
| 10,296,374 B2* | 5/2019 | Dai | H04L 12/4633 |
| 10,374,887 B2* | 8/2019 | Kerpez | H04L 41/04 |
| 10,416,986 B2* | 9/2019 | Mukhopadhyay | G06F 21/57 |
| 2012/0110186 A1 | 5/2012 | Kapur et al. | |
| 2015/0281006 A1 | 10/2015 | Kasturi et al. | |
| 2015/0363219 A1 | 12/2015 | Kasturi et al. | |
| 2017/0364422 A1 | 12/2017 | Antony et al. | |
| 2018/0270130 A1* | 9/2018 | Wang | H04L 43/50 |
| 2019/0026095 A1* | 1/2019 | Mukhopadhyay | G06F 8/65 |

OTHER PUBLICATIONS

Extended European Search Report dated Nov. 20, 2019 in counterpart EP Application No. 19180552.2, 7 pp.

* cited by examiner

SINGLE POINT OF MANAGEMENT FOR MULTI-CLOUD ENVIRONMENT INCLUDING ROUTE PROPAGATION, SECURITY, AND APPLICATION DEPLOYMENT

This application claims the benefit of U.S. Provisional Patent Application No. 62/718,765, filed on Aug. 14, 2018, the entire content of which is incorporated herein by reference.

TECHNICAL FIELD

The disclosure relates to computer networking, and more particularly, computer networking in a multi-cloud environment.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtual machines are a virtualization scheme based on machine-level virtualization. Virtual machines include a guest operating system that runs on a hypervisor of the host computing device to emulate the hardware of a computer to provide a new computer environment for executing applications.

Containerization is a virtualization scheme based on operation system-level virtualization. Containers are light-weight and portable execution environments for applications that are isolated from one another and from the host. Because containers are not tightly-coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

With containers' inherently lightweight nature, a single host can support many more container instances than traditional virtual machines (VMs). Often short-lived, containers can be created and moved more efficiently than VMs, and they can also be managed as groups of logically-related elements (sometimes referred to as "pods" for some orchestration platforms, e.g., Kubernetes). These container characteristics impact the requirements for container networking solutions: the network should be agile and scalable. VMs, containers, and bare metal servers may need to coexist in the same cloud environment, with communication enabled among the diverse deployments of applications. The container network should also be agnostic to work with the multiple types of orchestration platforms that are used to deploy containerized applications.

A cloud computing infrastructure that manages deployment and infrastructure for application execution may involve two main roles: (1) orchestration—for automating deployment, scaling, and operations of applications across clusters of hosts and providing computing infrastructure, which may include container-centric computing infrastructure; and (2) network management—for creating virtual networks in the network infrastructure to enable communication among applications running on virtual execution environments, such as containers or VMs, as well as among applications running on legacy (e.g., physical) environments. Software-defined networking contributes to network management.

Multi-cloud environment refers to the use of multiple clouds for computing and storage services. An enterprise may utilize an on-premise computing and/or storage service (e.g., on-premises cloud), and one or more off-premise clouds such as those hosted by third-party providers. Examples of the clouds include private, public, or hybrid public/private clouds that allow for ease of scalability while allowing different levels of control and security. An enterprise may utilize one or more of private, public, or hybrid public/private clouds based on the types of applications that are executed and other needs of the enterprise.

SUMMARY

In general, the disclosure describes examples where a single software-defined network (SDN) controller, executing on processing circuitry, establishes tunnels and controls communication on these tunnels between a plurality of virtual computing environments (VCEs). A VCE is provisioned in virtualized computing infrastructure, such as a public, private, or hybrid cloud. A virtual private cloud (VPC) is an example of VCE. Each of the VCEs supports one or more tenants or customers (e.g., enterprises), and in some examples, the VCEs need to communicate with one another to support various functions defined by the tenants. In some examples, a first VCE (e.g., private cloud) and a second VCE (e.g., public cloud) both support the same tenant, and the first and second VCEs may need to communicate with one another.

In some existing techniques, each VCE administrator would need to setup policies to establish communication tunnels between the different VCEs. Such separate management of VCEs to establish communication tunnels resulted in delays or errors due to the complications associated with ensuring proper route propagation, security, and application deployment, as a few examples. The techniques of this disclosure may provide one or more technical advantages. For example, the techniques provide for centralized control for communication between VCEs with a single controller, allowing one administrator to ensure proper route propagation, securing, and application deployment on the VCEs using a common interface. The common controller for route control within the VCEs and advertising among the VCEs may enable seamless and secure communications among multiple VCEs, in some cases distributed among on-premise and off-premise/public computing infrastructures. In this way, the multiple VCEs may appear to the operator or developer as a single compute fabric for distributed application execution.

In one example, the disclosure describes a system comprising a plurality of virtual computing environments (VCEs) in a multi-cloud network, a plurality of connect gateway routers, wherein each connect gateway router is associated with a logical endpoint within a logical tunnel mesh for respective VCEs, and a single software-defined networking (SDN) controller, executing on processing circuitry. The SDN controller is configured to establish the logical tunnel mesh to interconnect the plurality of VCEs in the multi-cloud network via respective connect gateway routers. To establish the logical tunnel mesh, the SDN controller is configured to determine one or more logical tunnels from the logical tunnel mesh to establish one or more communication links between a first VCE and a second VCE of the plurality of VCEs in the multi-cloud network. The SDN controller is also configured to advertise the one or more logical tunnels to the first VCE and the second VCE.

In one example, the disclosure describes a method comprising establishing, with a single software-defined networking (SDN) controller executing on processing circuitry, a logical tunnel mesh to interconnect a plurality of virtual computing environments (VCEs) in a multi-cloud network via respective connect gateway routers. Each connect gateway router is associated with a logical endpoint within a logical tunnel mesh for respective VCEs, and establishing the logical tunnel mesh comprises determining one or more logical tunnels from the logical tunnel mesh to establish one or more communication links between a first VCE and a second VCE of the plurality of VCEs in the multi-cloud network. The method also includes advertising the one or more logical tunnels to the first VCE and the second VCE.

In one example, the disclosure describes a computer-readable storage medium storing instructions thereon that when executed cause one or more processors, via execution of a single software-defined networking (SDN) controller, to establish, by execution of the SDN controller, a logical tunnel mesh to interconnect a plurality of virtual computing environments (VCEs) in a multi-cloud network via respective connect gateway routers. Each connect gateway router is associated with a logical endpoint within a logical tunnel mesh for respective VCEs. The instructions that cause the one or more processors, via execution of the SDN controller, to establish the logical tunnel mesh comprise instructions that cause the one or more processors, via execution of the SDN controller, to determine one or more logical tunnels from the logical tunnel mesh to establish one or more communication links between a first VCE and a second VCE of the plurality of VCEs in the multi-cloud network. The instruction cause the one or more processors, via execution of the SDN controller, to advertise the one or more logical tunnels to the first VCE and the second VCE.

The details of one or more examples are set forth in the accompanying drawings and the description below. Other features, objects, and advantages will be apparent from the description and drawings, and from the claims.

DETAILED DESCRIPTION

Figure 1:
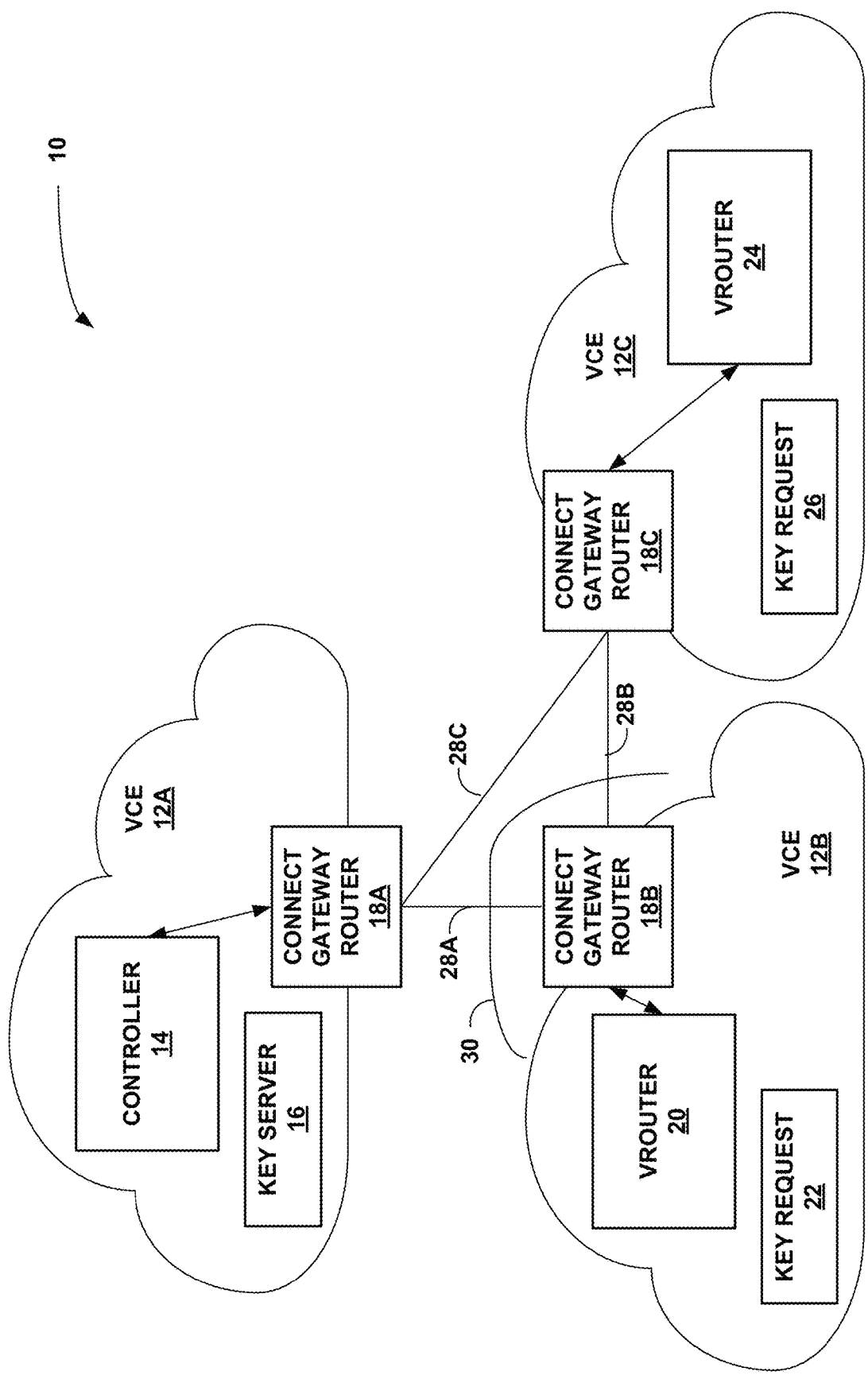
FIG. 1 is a block diagram illustrating an example multi-cloud network configured to communicate in accordance with one or more example techniques described in this disclosure.

FIG. 1 is a block diagram illustrating an example multi-cloud network configured to communicate in accordance with one or more example techniques described in this disclosure. As illustrated, multi-cloud network 10 includes virtual computing environments (VCEs) 12A-12C (collectively VCEs 12). VCEs 12 may be provisioned within a public, private, hybrid, or other "cloud" that provide storage and compute for various applications. A cloud may refer to computing infrastructure that may be virtualized to support one or more virtual computing environments provisioned thereon or may also or alternatively refer to a virtual computing environment itself. For instance, VCEs 12 may be provisioned on a plurality of servers hosted on a network (e.g., Internet) to store, manage, and process data, rather than on a personal computer. In some examples, one or more of VCEs 12 may be on-premises of an enterprise, and the other VCEs 12 are remote. In some examples, all of VCEs 12 may be remote from the enterprise.

A tenant (e.g., enterprise or individual) may use one or more VCEs 12 to off load storage or computation capabilities that can be handled faster or more efficiently on the servers of VCEs 12. For example, VCEs 12 provide access to much more memory storage than would be available on a personal computer, or within a server located on-premises. VCEs 12 may also provide much more compute power, to handle complex tasks such as large data processing, than would be available on a personal computer, or within a server located on-premises. Moreover, VCEs 12 provide redundancy storage. Accordingly, tenants are relying more and more on networks such as multi-cloud network 10.

However, there may be technical problems with management of VCEs 12. VCEs 12 may be located in various locations throughout the world. A tenant may need data from one of VCEs 12 to be transmitted to another one of VCEs 12. Therefore, an administrator needs to establish communication links between each of VCEs 12 to allow for such communication. Due to the remote locations of VCEs 12, datacenters that house the servers that host VCEs 12 tend to have different administrators that need to each configure respective VCEs 12 to be configured to communicate with other VCEs 12.

Moreover, each one of VCEs 12 hosts multiple different tenants. Therefore, additional technical problems may arise to ensure communication security. For instance, VCE 12A may host services for a first and a second tenant, and VCE 12B may host services for the first and a third tenant. Any data transmitted by VCE 12A for the first tenant to VCE 12B should not be accessible by the third tenant, and any data transmitted by VCE 12B for the first tenant to VCE 12A should not be accessible by the second tenant.

This disclosure describes examples of centralized controller (e.g., controller 14) that allows one administrator, with a single pane of glass, to control the interconnections and security within multi-cloud network 10. For example, controller 14, which may be a software-defined networking (SDN) controller, offers a standards-based networking and network isolation software for physical, virtual, container, and next generation server less environments. Controller 14 may provide multi-dimension segmentation and policy enforcement for workloads deployed in physical, virtual, container, and server less environments. For instance, controller 14 may provide connectivity across VCEs 12 and enables policy based secure routing, connectivity, and data path encryption across hybrid clouds, multi-region and site, and compute infrastructure.

Figure 2:
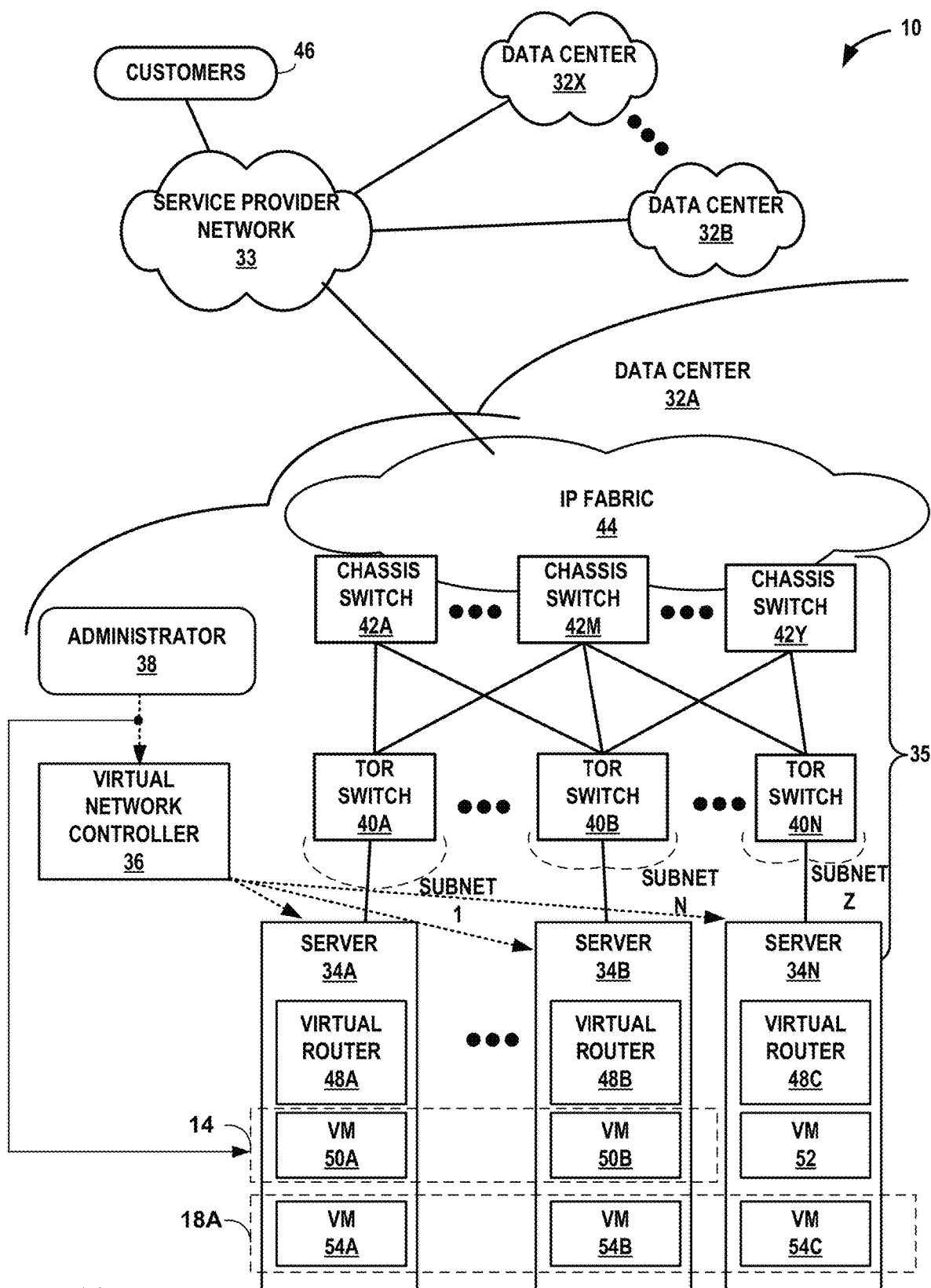
FIG. 2 is a block diagram illustrating an example multi-cloud network having a data center in which examples of the techniques described herein may be implemented.

As described in more detail with respect to FIG. 2, controller 14 executes on processing circuitry. The processing circuitry may be distributed processing circuitry across a plurality of servers or may be processing circuitry in a single server. For instance, the servers, such as within VCE 12A, execute virtual machines (VMs) on their respective processing circuitry, and controller 14 executes in one or more of the VMs. In this way, controller 14 may be considered as executing on one or more processing circuitry.

In some examples, controller 14 executes on computing device that a network administrator for a particular tenant accesses. However, the cloud (e.g., one or more VCEs 12) may be considered as simply another physical location, although operating in a virtualized environment. Therefore, controller 14 need not necessarily execute on a computing device that a network administrator is accessing, but could be executing in a virtualized environment within any of VCEs 12.

The network administrator may interface with only controller 14 to establish proper, secure communication links for the tenants of the network administrator. For example, some other techniques would require the network administrator to interface with a first controller for VCE 12A, a second controller for VCE 12B, and so forth. With the example techniques, the network administrator may interface with only controller 14 via a single pane of glass to establish the communication links between VCEs 12.

As illustrated, VCE 12A includes controller 14 and connect gateway router 18A. VCE 12B includes virtual router ("vrouter") 20 and connect gateway router 18B, and VCE 12C includes vrouter 24 and connect gateway router 18C. Although not illustrated, VCE 12A may also include a vrouter. Although VCE 12B and 12C are shown as having a single vrouter (e.g., vrouter 20 and 24, respectively), VCE 12B and 12C may include a plurality of vrouters. For example, if VCE 12B and 12C are implemented across multiple servers, each server may execute a corresponding vrouter. Examples of vrouter 20 and 24 and connect gateway routers 18A-18C are described in more detail below. In general, vrouter 20 and 24 and connect gateway routers 18A-18C are software applications executing on respective servers within remote data centers. In one or more examples, connect gateway routers 18A-18C form as logical endpoints for respective VCEs 12. For example, connect gateway routers 18A-18C are configured route data from respective VCEs 12 to other VCEs 12.

Each of connect gateway routers 18 may represent an Amazon Web Services VPC virtual gateway, a Google Cloud Router, or a Tungsten Fabric or Contrail or Open-Contrail Gateway, or other software gateway for a virtual computing environment, for example.

Once data reaches one of VCEs 12, connect gateway routers 18A-18C may not be configured to further route the communication within the respective VCEs 12. However, the example techniques are not so limited, and connect gateway routers 18A-18C may be configured to further route the communication within the respective VCEs 12.

In one or more examples, controller 14 (e.g., a single controller 14) may be configured to establish communication links between VCEs 12. In this manner, controller 14 may be configured to establish a full mesh of communication tunnels that interconnect VCEs 12. In the example illustrated in FIG. 1, connect gateway routers 18A and 18B are connected via tunnel 28A, connect gateway routers 18B and 18C are connected via tunnel 28B, and connect gateway routers 18C and 18A are connected via tunnel 28C. In this manner, tunnels 28A-28C represent a full mesh of communication tunnels for VCEs 12 to communicate with one another. In this way, each one of connect gateway routers 18 is associated with a logical endpoint within a logical tunnel mesh for respective VCEs 12.

Tunnels 28 may be logical tunnels in that tunnels 28 from an overlay over an underlay of physical connections. As one example, tunnels 28 may be formed over the Internet. Therefore, tunnels 28 represent the manner in which VCEs 12 may be interconnected through the Internet, regardless of the particular underlaying hardware components of the Internet tunnels 28 utilize for communication.

There may be various example ways in which controller 14 may establish tunnels 28. As one example, controller 14 utilizes Internet Protocol Security (IPSec) sessions or secure sockets layer (SSL) protocol or transport layer security (TLS) protocol between connect gateway routers 18 to establish tunnels 28 so that VCEs 12 can communicate via the Internet. In some examples, controller 14 may utilize IPSec sessions between vrouter 20 and 24, and possibly the vrouter of VCE 12A, for communication via the Internet. As one example, controller 14 establishes IPSec session between vrouter 20, 24 and controller 14 in examples where controller 14 is either in a public or private cloud and vrouters 20, 24 are deployed across geographically distributed environments. In examples where controller 14 establishes tunnels 28 via IPSec sessions, each one of respective connect gateway routers 18 vrouters 20 and 24 may communicate using user datagram (UDP) encapsulated in encapsulating security payload (ESP) packets.

By establishing the logical tunnel mesh, controller 14 may be configured to determine one or more logical tunnels from the logical tunnel mesh to establish one or more communication links between a first VCE and a second VCE. As one example, as part of establishing the logical tunnel mesh, controller 14 may determine that tunnel 28A is a communication link for VCEs 12A and 12B to communicate with one another, tunnel 28B is a communication link for VCEs 12B and 12C to communicate with one another, and tunnel 28C is a communication link for VCEs 12C and 12A to communicate with one another.

In addition to establishing logical tunnel mesh, controller 14 may be configured to advertise routes via the tunnels 28 to VCEs 12. There may be various ways in which controller 14 advertises routes via tunnels 28. As one example, controller 14 advertises routes via broadcast gateway protocol (BGP). In other words, route advertisements for IPSec tunnel establishment is done via BGP.

In some cases, connect gateway routers 18 operate BGP sessions over tunnels 28. Controller 14 may configure connect gateway routers 18 with configuration information for the BGP sessions. Using the BGP sessions, connect gateway routers 18 may exchange route information for respective VCEs 12 each operating within a computing infrastructure. Tunnels 28 may form a full BGP mesh. The BGP may be exterior BGP or interior BGP (iBGP).

Connect gateway routers 18 may each be associated with a public address (or endpoint) for which network address translation (NAT) is performed to allow packet exchange among connect gateway routers 18 and, in addition, IP reachability between instances logically located in different VCEs 12. Controller 14 may establish and configure the route control for each of connect gateway routers 18 and thereby manage all routing for the system 10. Routes may be routes for computing devices (virtual and/or physical) within VCEs 12.

Controller 14 may further be configured to ensure secure communication between VCEs 12. For instance, as described above, secure communication may be needed to ensure that unintended entities are unable to peer into communication. As one example, VCE 12C may be private cloud that is specifically configured with established security to form a private secure network. As one example, VCE 12B is a cloud that is deployed behind a firewall illustrated conceptually as firewall 30.

In one or more examples, but not necessarily all examples, controller 14 may be configured to manage security keys in addition to establishing a logical tunnel mesh and advertising routes of tunnels through the tunnel mesh. For instance, VCE 12A includes key server 16. Key server 16 is illustrated as part of VCE 12A to show that entitlement and key management is deployed in the cloud of multi-cloud network 10. Key server 16 need not necessarily reside in the same VCE as controller 14. For example, key server 16 may located separately from controller 14, but may be under the control of controller 14.

As described above, in some examples, controller 14 establishes the logical tunnel mesh using IPSec sessions. Controller 14 may generate certificates based on specific entitlement used in the Internet Key Exchange (IKE) phase of the IPSec tunnel establishment. For example, key request 22 or key request 26 may request keys, and the request is sent to respective ones of vrouter 20 or vrouter 24 deployed across multi-cloud network 10. Connect gateway routers 18B and 18C forward the key request to controller 14 via connect gateway router 18A.

To further ensure secure communication, controller 14 may be configured to maintain security policies that indicate which tunnels 28 are specifically configured to carry encrypted or otherwise secure communications. Controller 14 may include a bit in the policy enforcement framework that is enabled per flow. The status of the bit indicates whether workload packets (e.g., data) is communicated through secure tunnels for secured forwarding.

FIG. 2 is a block diagram illustrating an example multi-cloud network having a data center in which examples of the techniques described herein may be implemented. FIG. 2 illustrates data centers 32A-32X, which house servers that form respective ones of VCEs 12. As one examples, data center 32A houses servers 34A-34N that may be configured to provide the infrastructure for VCE 12A. The other data centers 34 may be substantially similar to data center 32A, but may house servers for other VCEs 12. Also, one of data centers 32 may house servers for multiple VCEs 12.

As illustrated data centers 32A-32X (collectively, "data centers 32") are interconnected with one another and with customer networks associated with customers 46 via a service provider network 33. In general, each data center 32A provides an operating environment for applications and services for customers 46 coupled to the data center by service provider network 33. Data centers 32 may, for example, host infrastructure equipment, such as networking and storage systems, redundant power supplies, and environmental controls. Service provider network 33 may be coupled to one or more networks administered by other providers, and may thus form part of a large-scale public network infrastructure, e.g., the Internet.

In some examples, each data centers 32 may represent one of many geographically distributed network data centers. As illustrated in the example of FIG. 2, each of data centers 32 may represent a facility that provides network services for customers 46. Customers 46 may be collective categories such as enterprises and governments or individuals. For example, a network data center may host a virtual computing environment (e.g., cloud) that provides web services for several enterprises and end users. Other exemplary services may include data storage, virtual private networks, traffic engineering, file service, data mining, scientific- or supercomputing, and so on. In some examples, each of data centers 32 may be individual network servers, network peers, or otherwise.

In the illustrated example, each of data centers 32 includes a set of storage systems and application servers 34A-34N (herein, "servers 34") interconnected via high-speed switch fabric 35 provided by one or more tiers of physical network switches and routers. Switch fabric 35 is provided by a set of interconnected top-of-rack (TOR) switches 40A-40N (collectively, "TOR switches 40") coupled to a distribution layer of chassis switches 42A-42Y (collectively, "chassis switches 42"). Although not shown, each of data centers 32 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In this example, TOR switches 40 and chassis switches 42 provide servers 34 with redundant (multi-homed) connectivity to IP fabric 44 and service provider network 33. Chassis switches 42 aggregate traffic flows and provides high-speed connectivity between TOR switches 40. TOR switches 40 may be network devices that provide layer two (e.g., MAC) and/or layer 3 (e.g., IP) routing and/or switching functionality. TOR switches 40 and chassis switches 42 may each include one or more processors and a memory, and that are capable of executing one or more software processes. Chassis switches 42 are coupled to IP fabric 44, which performs layer 3 routing to route network traffic between data centers 32 and customers 46 by service provider network 33.

In the example illustrated in FIG. 2, data center 32A is configured to provide the infrastructure for VCE 12A. For example, servers 34A-34N may be configured to execute virtualized machines (VMs) to support the operation of VCE 12A. Moreover, in the example of FIG. 1, controller 14 is part of VCE 12A. Accordingly, servers 34A-34N may be configured to support the operation of controller 14.

As illustrated in FIG. 2, servers 34A and 34B execute VMs 50A and 50B. In this example, VMs 50A and 50B together provide a virtualized machine on which controller 14 can execute and perform the example operations of controller 14 described in this disclosure (e.g., provide a centralized controller to ensure proper route propagation, securing, and application deployment on the VCEs with a single pane of glass interface). Servers 34A, 34B, and 34N execute VMs 54A, 54B, and 54C. In this example, VMs 54A, 54B, and 54C together provide a virtualized machine on which connect gateway router 18A executes and performs the example operations of connect gateway router 18A described in this disclosure (e.g., form a logical endpoint within a logical tunnel mesh for VCE 12A).

Server 34N is also illustrated as executing VM 52. VM 52 may provide a virtualized machine on which applications that are to execute within VCE 12A execute. For example, VCE 12A may provide computation resources to offload computationally complex tasks from a personal computer. In some examples, VM 52 is the platform on which the applications execute to perform the tasks offloaded from the personal computer.

VMs 50A, 50B, 52, 54A, 54B, and 54C are illustrated merely to assist with understanding and should not be considered as limiting. For example, virtualized network controller 36 may be configured to spin up and spin down virtual machines across or within servers 34 as needed to support the operations of controller 14, connect gateway router 18A, and VCE 12A. However, the example techniques are not so limited, and in some examples, controller 14 may be configured to determine resources within data center 32A that are to be utilized (e.g., how many VMs are spun up or spun down) for VCE 12A. Moreover, in some examples, controller 14 may be configured to determine resources within the other data centers 32 that are to be utilized (e.g., how many VMs are spun up or spun down) for the other VCEs 12.

VMs 50A, 50B, 52, 54A, 54B, and 54C execute on processing circuitry of respective servers 34A, 34B, and 34N. An example of processing circuitry on which VMs 50A, 50B, 52, 54A, 54B, and 54C execute is illustrated in more detail with respect to FIG. 13.

Virtual network controller 36 ("VNC") provides a logically and in some cases physically centralized controller for facilitating operation of one or more virtual networks within each of data centers 32, such as data center 32A. In some examples, virtual network controller 36 may operate in response to configuration input received from network administrator 38. Moreover, as illustrated, in this example, administrator 38 may be tasked with providing configuration information for controller 14 so that controller 14 can perform the example operations described in this disclosure. Administrator 38 may represent an operator, developer, or application deployment specialist that uses a common interface to create and deploy virtual computing environment topologies to virtualized network controller 36 and controller 14 for provisioning within the computing infrastructure. Additional information regarding virtual network controller 36 operating in conjunction with other devices of data center 32A or other software-defined network is found in International Application Number PCT/US2013/044378, filed Jun. 5, 2013, and entitled "PHYSICAL PATH DETERMINATION FOR VIRTUAL NETWORK PACKET FLOWS;" and in U.S. patent application Ser. No. 14/226,509, filed Mar. 26, 2014, and entitled "Tunneled Packet Aggregation for Virtual Networks," each which is incorporated by reference as if fully set forth herein.

In some examples, the traffic between any two network devices, such as between network devices within IP fabric 44 (not shown), between servers 34, and customers 46, or between servers 34, for example, can traverse the physical network using many different paths. A packet flow (or "flow") can be defined by the five values used in a header of a packet, or "five-tuple," i.e., the protocol, source IP address, destination IP address, source port and destination port that are used to route packets through the physical network. For example, the protocol specifies the communications protocol, such as TCP or UDP, and source port and destination port refer to source and destination ports of the connection.

The flow within data center 32A is one example of a flow. Another example of a flow is the flow of data between VCEs 12. As described above, examples of flow between VCEs 12 include UDP encapsulated ESP packets.

A set of one or more packet data units (PDUs) that include a packet header specifying a particular five-tuple represent a flow. Flows may be broadly classified using any parameter of a PDU, such as source and destination data link (e.g., MAC) and network (e.g., IP) addresses, a Virtual Local Area Network (VLAN) tag, transport layer information, a Multi-protocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port. A flow may be additionally or alternatively defined by an Application Identifier (AppID) that is determined by a virtual router agent or other entity that identifies, e.g., using a port and protocol list or deep packet inspection (DPI), a type of service or application associated with the flow in that the flow transports application data for the type of service or application.

Accordingly, FIG. 2 illustrates an example of a VCE 12A in a multi-cloud network 10. For example, in FIG. 2, a single SDN controller 14 is configured to establish the logical tunnel mesh to interconnect the plurality of VCEs 12 in the multi-cloud network via respective connect gateway routers 18. SDN controller 14 is also configured to advertise the one or more logical tunnels to VCEs 12. As illustrated in FIG. 2, data center 32A includes one or more virtual machines executing on one or more servers, such that the one or more virtual machines form an infrastructure for VCE 12A, and at least one of the virtual machines executes a connect gateway router 18A to form the logical endpoint for VCE 12A. For example, in FIG. 2, VMs 50A and 50B on servers 34A and 34B, respectively, form an infrastructure for controller 14, VM 52 form on server 34N forms an infrastructure for VCE 12A, and VMs 54A, 54B, and 54C on servers 34A, 34B, and 34C, respectively, form an infrastructure for connect gateway router 18A.

Although FIG. 2 illustrates one example of data center 32A, other data centers may be substantially similar, but may not execute an instance of controller 14. For example, a set of one or more virtual machines executing on second set of one or more servers in data center 32A form an infrastructure for VCE 12B. Also, at least one of the set of one or more virtual machines executes connect gateway router 18B to form the logical endpoint for VCE 12B. In this example, controller 14 is configured to establish a logical tunnel (e.g., tunnel 28A) of the logical tunnel mesh that interconnects the connect gateway router 18A and connect gateway router 18B.

Figure 3:
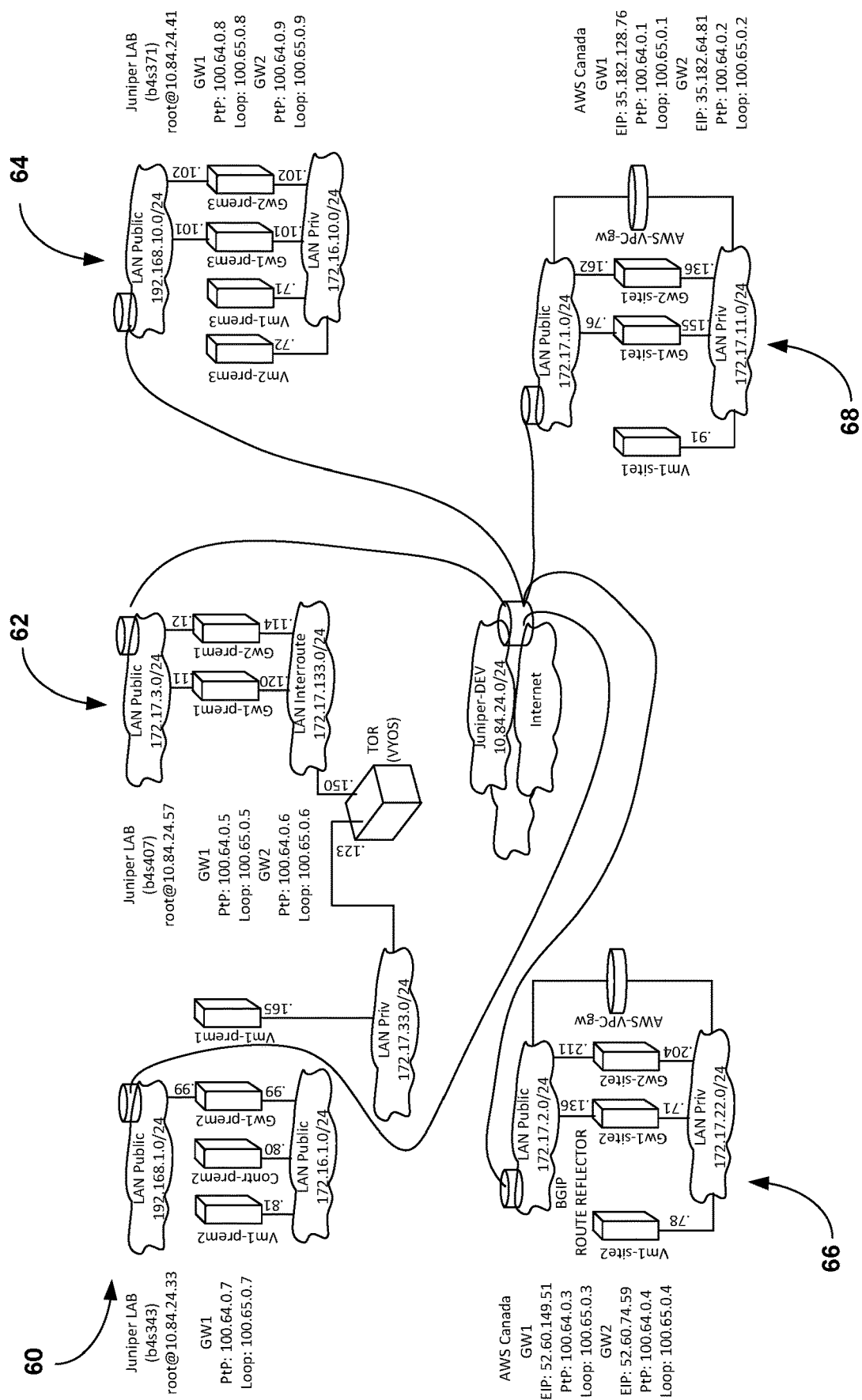
FIG. 3 is a block diagram illustrating an example multi-cloud network configured to communicate in accordance with one or more example techniques described in this disclosure.

FIG. 3 is a block diagram illustrating an example multi-cloud network configured to communicate in accordance with one or more example techniques described in this disclosure. For instance, FIG. 3 illustrates data centers 60, 62, 64, 66, and 68, and each may host one or more VCEs. In FIG. 3, one example of controller 14 (identified as contr-prem2 in FIG. 3) executes on servers within data center 60. As illustrated, each of data centers 60, 62, 64, 66, and 68 support a public LAN that interconnect the data centers via the Internet. Each of the respective public LANs are coupled to respective connect gateway routers. For example, the public LAN of data center 60 is connected to a connect gateway router (identified as gw1-prem2), the public LAN of data center 62 is connect to two connect gateway routers (identified as gw1-prem1 and gw2-prem1), and so forth. In this way, each connect gateway router is associated with a logical endpoint within a logical tunnel mesh for respective VCEs. In some examples, the data centers may be connected with SSL tunnels (e.g., Hybrid Cloud with SSL tunnel) or IPSec tunnels.

In accordance with one or more examples described in this disclosure, contr-prem2 (e.g., controller 14 executing on servers within data center 60) may be configured to establish the logical tunnel mesh shown in FIG. 3 that interconnects the VCEs via the Internet, allowing one administrator to ensure proper route propagation, securing, and application deployment on the VCEs with a single pane of glass interface. For example, an administrator may need to execute an application that provides a graphical user interface (GUI) or even a text interface to access the controls of contr-prem2, and with this one interface, the administrator can establish the tunnel mesh (e.g., using IPSec sessions) and advertise the routes (e.g., using BGP). Furthermore, with the one interface, the administrator can establish security policies to ensure desired level of security.

Figure 4:
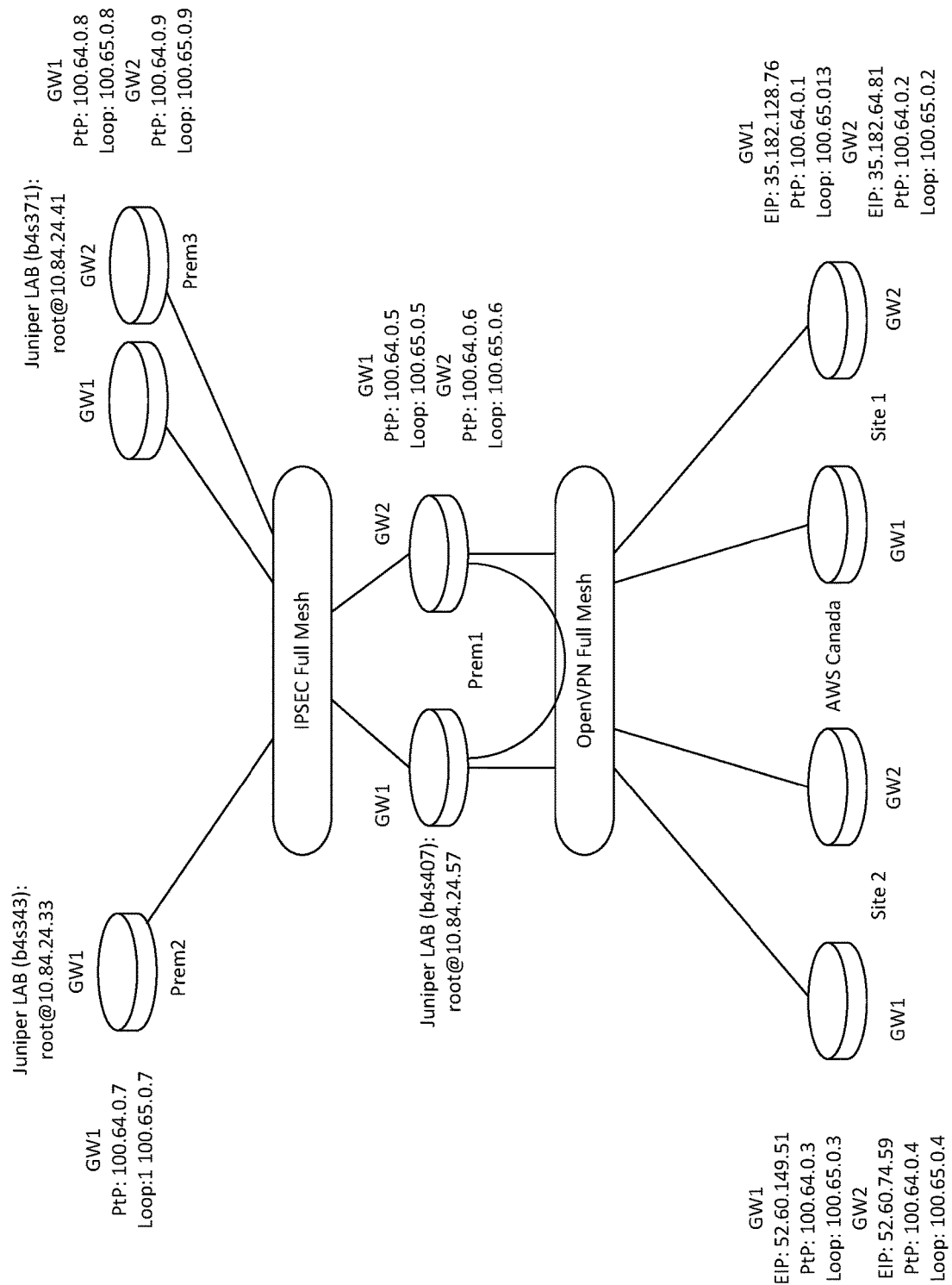
FIG. 4 is a block diagram illustrating an example multi-cloud network configured to communicate in accordance with one or more example techniques described in this disclosure.

FIG. 4 is a block diagram illustrating an example multi-cloud network configured to communicate in accordance with one or more example techniques described in this disclosure. For example, FIG. 4 illustrates an example of a IPSec full mesh so that gateway controllers are different premises can communicate with other another. For example, premises 1 (prem1) includes two connect gateway routers (GW1 and GW2) to support two VCEs, premises 2 (prem2) includes one connect gateway router (GW1) to support one VCE, and premises 3 (prem3) includes two gateway routers (GW1 and GW2) to support two VCEs. FIG. 4 also illustrates an OpenVPN full mesh that connects to different sites having their own respective connect gateway routers. In one or more examples, controller 14 may be configured to establish the example IPSec full mesh illustrated in FIG. 4, and possibility also the OpenVPN full mesh, where an administrator can use the single pane of glass to control controller 14 to establish the IPSec full mesh and the Open VPN mesh. In some examples, the data centers may be connected with SSL tunnels or IPSec tunnels (e.g., Hybrid Cloud with IPSec ESP tunnel).

Figure 5:
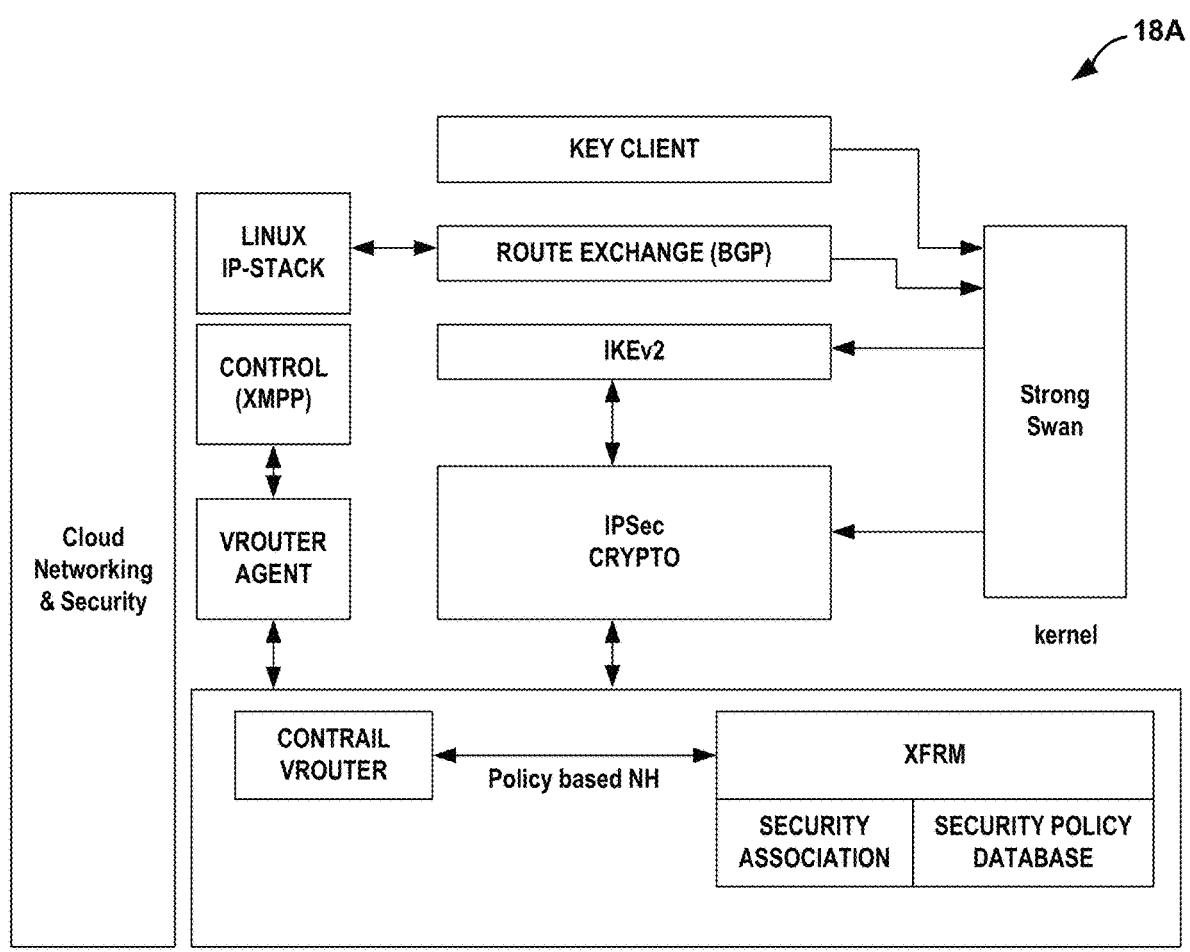
FIG. 5 is a block diagram illustrating an example connect gateway router in accordance with one or more example techniques described in this disclosure.

FIG. 5 is a block diagram illustrating an example connect gateway router 18A in accordance with one or more example techniques described in this disclosure. For ease, the IPSec session module (IPSec Crypto) and key exchange modules (IKEv2) are illustrated as part of connect gateway router 18A. However, the example techniques are not so limited, and these components may be part of controller 14. The example illustrated in FIG. 5 is merely meant to provide one example, and should not be considered limiting.

Figure 6:
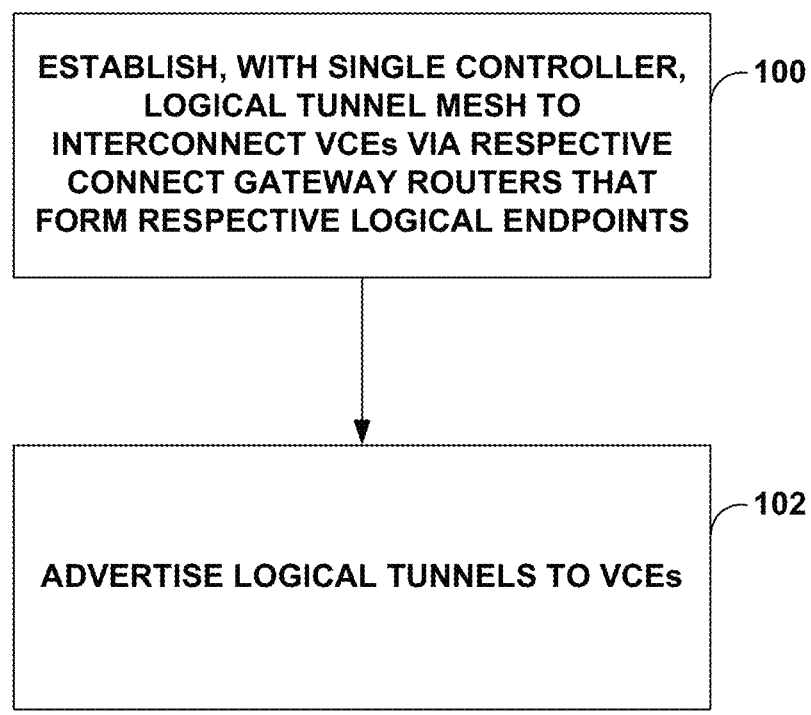
FIG. 6 is a flowchart illustrating an example method of operation in accordance with one or more example techniques described in this disclosure.

FIG. 6 is a flowchart illustrating an example method of operation in accordance with one or more example techniques described in this disclosure. FIG. 6 describes an example method in a system that includes a plurality of virtual computing environments (e.g., VCEs 12) in multi-cloud network 10. For example, in multi-cloud network 10, a single software-defined networking (SDN) controller 12 is configured to establish a logical mesh to interconnect the plurality of VCEs 12 in multi-cloud network 10 via respective connect gateway routers 18 (100).

As one example, VCEs 12 are VCEs that support one tenant. For instance, a tenant utilizes two or more of VCEs 12 to perform operations that are well suited to be performed in a cloud infrastructure. In some cases, an administrator for the tenant would have needed to setup tunnels separately at each of the locations of VCEs 12 so that servers on which the applications for the tenant are executing can communicate with one another. With the example techniques described in this disclosure, with single network controller 14, the administrator is able to establish tunnels 28 between VCEs 12 with a single pane of glass.

Connect gateway routers 18 may each form as a logical endpoint within the logical tunnel mesh for respective VCEs 12. In one example, as part of establishing the logical tunnel mesh, controller 14 may be configured to determine one or more logical tunnels (e.g., tunnel 28A) from the logical tunnel mesh to establish one or more communication links between a first VCE (e.g., VCE 12A) and a second VCE (e.g., VCE 12B).

As one example, a first set of one or more virtual machines execute on a first set of one or more servers, and the first set of one or more virtual machines form an infrastructure for the first VCE. Also, at least one of the first set of one or more virtual machines executes a connect gateway router to form the logical endpoint for the first VCE. A second set of one or more virtual machines executes on a second set of one or more servers. The second set of one or more virtual machines form an infrastructure for the second VCE, and at least one of the second set of one or more virtual machines executes a second connect gateway router to form the logical endpoint for the second VCE. In this example, as part of establishing the logical tunnel mesh, controller 14 is configured to establish a logical tunnel of the logical tunnel mesh that interconnects the first connect gateway router and the second connect gateway router.

Controller 14 may be configured to advertise the one or more logical tunnels to the first VCE and the second VCE. In this way, with a single pane of glass (e.g., with one interface to the single controller 14), an administrator may be able to configure communication between different VCEs to allow for proper route propagation that is secure, rather than establish communication links on a VCE-by-VCE or data center-by-data center basis. For example, for security purposes, at least one of the VCEs includes a key server configured to generate certificates to be deployed to one or more of the VCEs for encrypted communication. Controller 14 may be configured to cause the key server to generate certificates during the establishing of the logical tunnel mesh.

In some examples, to establish the logical tunnel mesh, controller 14 is configured to establish Internet Protocol Security (IPSec) sessions between the connect gateway routers 18 of respective VCEs 12. Also, in some examples, to advertise the one or more logical tunnels, controller 14 may be configured to advertise the one or more logical tunnels via Border Gateway Protocol (BGP).

Figure 7:
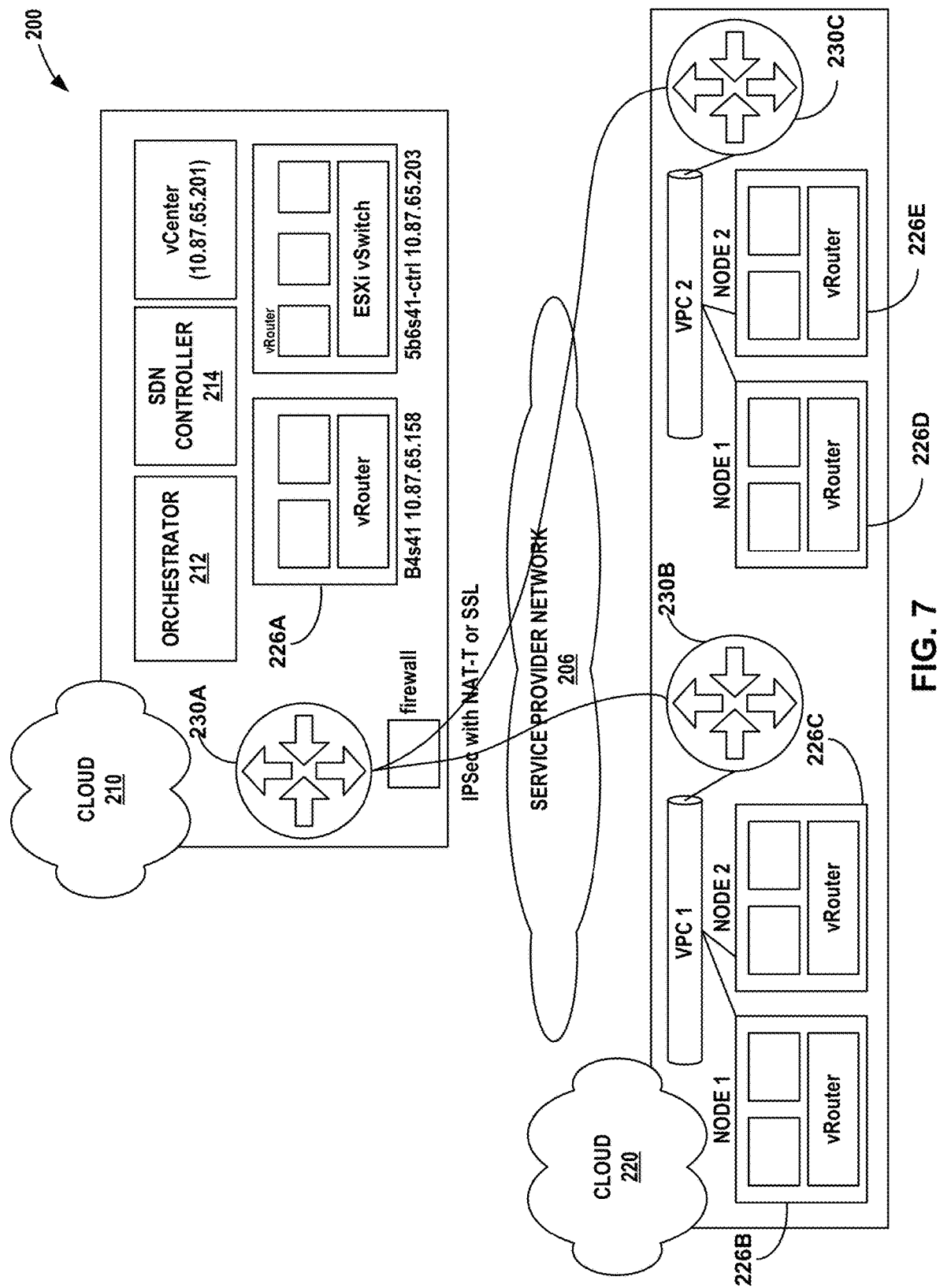
FIG. 7 is a block diagram illustrating an example network including a controller for directing information within network, according to techniques described in this disclosure.

FIG. 7 is a block diagram illustrating an example network 200 including a controller 214 for directing information within network 200, according to techniques described in this disclosure. Service provider network 206 may be an example of service provider network 33 of FIG. 2. Cloud 210 may be an example of data center 32A of FIG. 2. Controller 214 and orchestrator 212 may implement an overall controller, such as controller 14 of FIG. 1. Cloud 220 may be an example of any one of data centers 32B-32X of FIG. 2.

Controller 212 provides a logically and in some cases physically centralized controller for facilitating operation of one or more virtual networks within each of cloud 210 and cloud 220, such as VPC 1 of cloud 220, in accordance with one or more embodiments of this disclosure. In some examples, controller 212 may operate in response to configuration input received from a transformer.

In some examples, orchestrator 212 manages functions of cloud 210 such as compute, storage, networking, and application resources. For example, orchestrator 212 may create a virtual network for a tenant within cloud 210 or across data centers. Orchestrator 212 may attach virtual machines (VMs) to a tenant's virtual network. Orchestrator 212 may connect a tenant's virtual network to an external network, e.g. the service provider network 206 or cloud 220. Orchestrator 212 may implement a security policy across a group of VMs or to the boundary of a tenant's network. Orchestrator 212 may deploy a network service (e.g. a load balancer) in a tenant's virtual network. In some examples, controller 214 maintains routing, networking, and configuration information within a state database. In some examples, orchestrator 212 uses Kubernetes for automating deployment, scaling, and management of containerized applications. For example, orchestrator 212 may use Kubernetes to deploy containers to any one of servers 226A-226E (collectively, "servers 226") via controller 214. In some examples, the containers may include Docker containers. Orchestrator 212 may output instructions to controller 214 to deploy containers to servers 226 via gateway 230.

Groups of servers 226 (e.g., server 226B and 226C) may be interconnected via a high-speed switch fabric (not shown) provided by one or more tiers of physical network switches and routers. The switch fabric is provided by a set of interconnected top-of-rack (TOR) switches (not shown) coupled to a distribution layer of chassis switches (not shown). Although not shown, each of cloud 210 and cloud 220 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Each server of servers 226 may include at least one virtual router and at least one container or virtual machine.

Gateway 230A-230C (collectively, "gateway 230" and may be examples of connect gateway routers 18) may provide virtual private network (VPN) services for providing connectivity over a wide area network (WAN). Tenant isolation may be performed for a tenant application workload using a standards based VPN. Gateway 230 may provide the same security posture for each data center 110A using a security policy framework. Additionally, gateway 230 may provide resiliency across availability zones in public and private cloud environments. Gateway 230 may be configured for role-based access control (RBAC) and integration with active directory/lightweight directory access protocol (AD/LDAP). In some examples, gateway 230 may enable controller 202 to transport packets, including containers, between one or more data centers. Gateway 230 may use an encrypted connection (e.g., IPSec with Nat-t or SSL) to exchange information between gateway portals 230A, 230B, and 230C.

Figure 8:
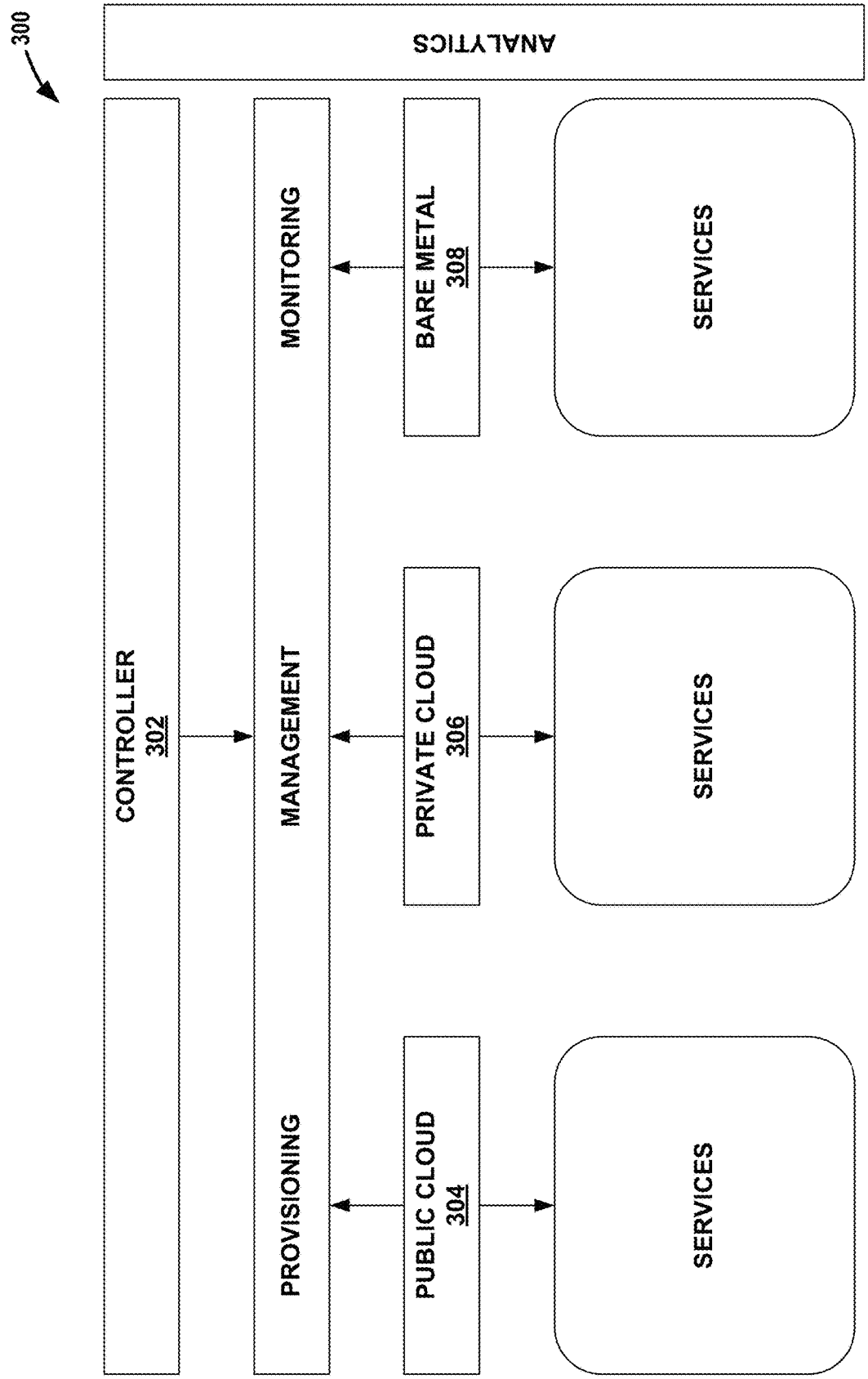
FIG. 8 is a block diagram illustrating another example network including a controller, a public cloud, a private cloud, and a bare-metal server system, according to techniques described in this disclosure.

FIG. 8 is a block diagram illustrating an example multi-cloud computing infrastructure 300 including a controller 302 (which is an example of controller 14), a public cloud 304, a private cloud 306, and a bare-metal server system 308, according to techniques described in this disclosure. In some examples, controller 302 may provision the public cloud 304, the private cloud 306, and the bare-metal server system 308 by mapping software to respective nodes. Provisioning includes a process of preparing and equipping a network, thus allowing the network to provide new services. For example, the provisioning may include using controller 302 to deploy containers to nodes of any one of the public cloud 304, the private cloud 306, and the bare-metal server system 308. Additionally, the provisioning may include using controller 302 to enable security (e.g., activate or program firewalls) on of any one of the public cloud 304, the private cloud 306, and the bare-metal server system 308. Additionally, controller 302 may monitor and manage each of the public cloud 304, the private cloud 306, and the bare-metal server system 308. For example, if the network 300 receives instructions to perform a new task, controller 302 may provision network 300 to perform the new task by deploying new software and creating new infrastructure configurations in at least one of the public cloud 304, the private cloud 306, and the bare-metal server system 308. Controller 302 may represent an example instance of controller 14 of FIG. 1.

Figure 9:
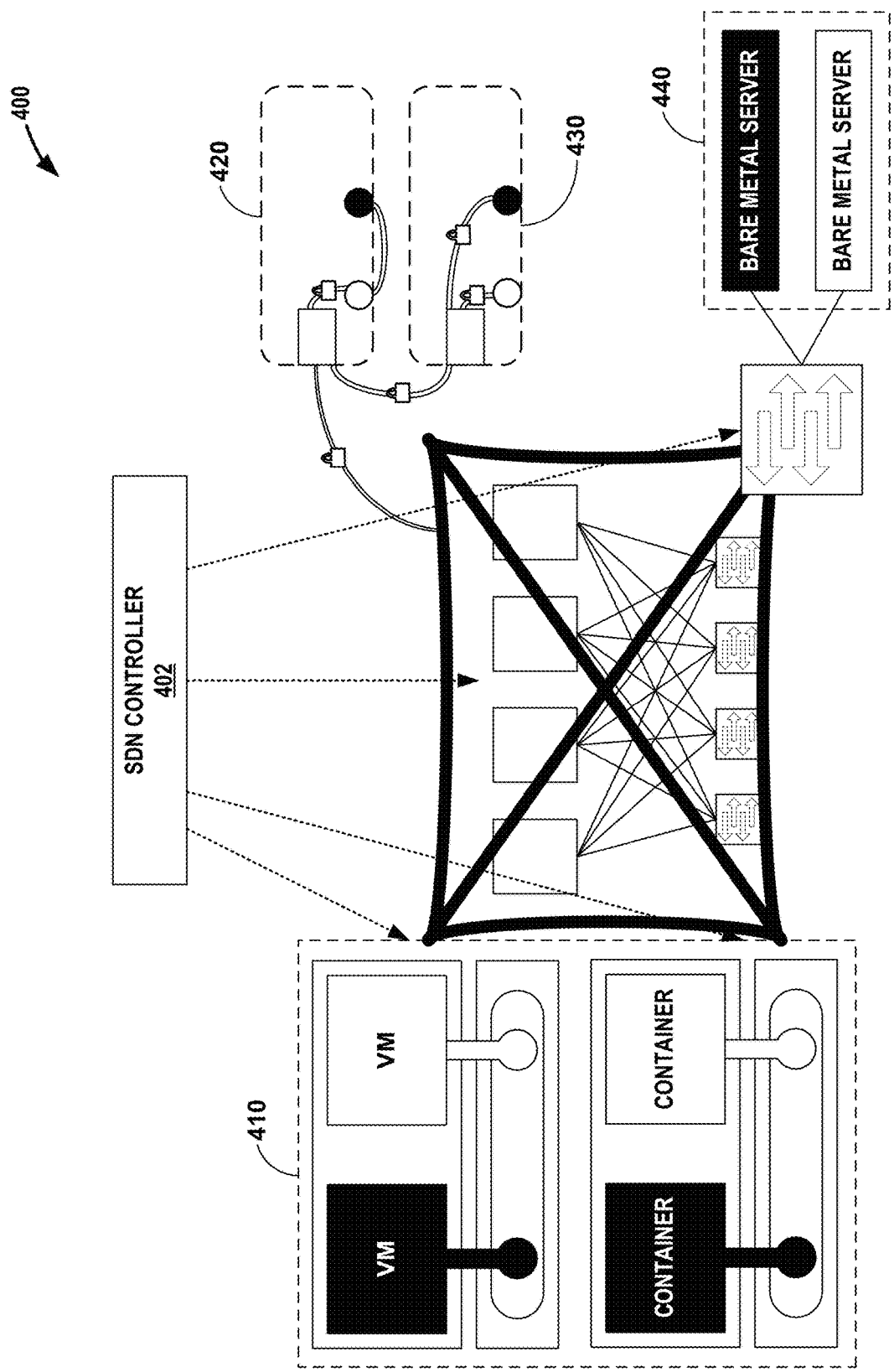
FIG. 9 is a conceptual diagram illustrating another example multi-cloud computing infrastructure managed using a controller, according to techniques described in this disclosure.

FIG. 9 is a conceptual diagram illustrating another example multi-cloud computing infrastructure 400 managed using a controller, according to techniques described in this disclosure. Controller 402, which is an example of controller 14, of network 400 may deploy software to data centers including server 410, VPC 420, VPC 430, and bare-metal server system 440. Server 410 may include one or more virtual machines and one or more containers. Additionally, VPC 420, VPC 430, and bare-metal server system 440 may include one or more virtual machines and one or more containers. In some examples, controller 402 may deploy containers to build computing infrastructures in the data centers. Controller 402 may receive instructions from a transformer (not pictured). The instructions may be indicative of data (e.g., containers, objects, applications, or the like) to be deployed to each respective data center to achieve a desired virtual computing environment. Additionally, the data centers may output information indicative of a current state of network structure to controller 402. The transformer may be configured to use the current state of the virtual computing environment output by the data centers and the desired state of the virtual computing environment to produce templates. The templates may be applied by controller 400 to build the plurality of computing infrastructures of the data centers.

Figure 10:
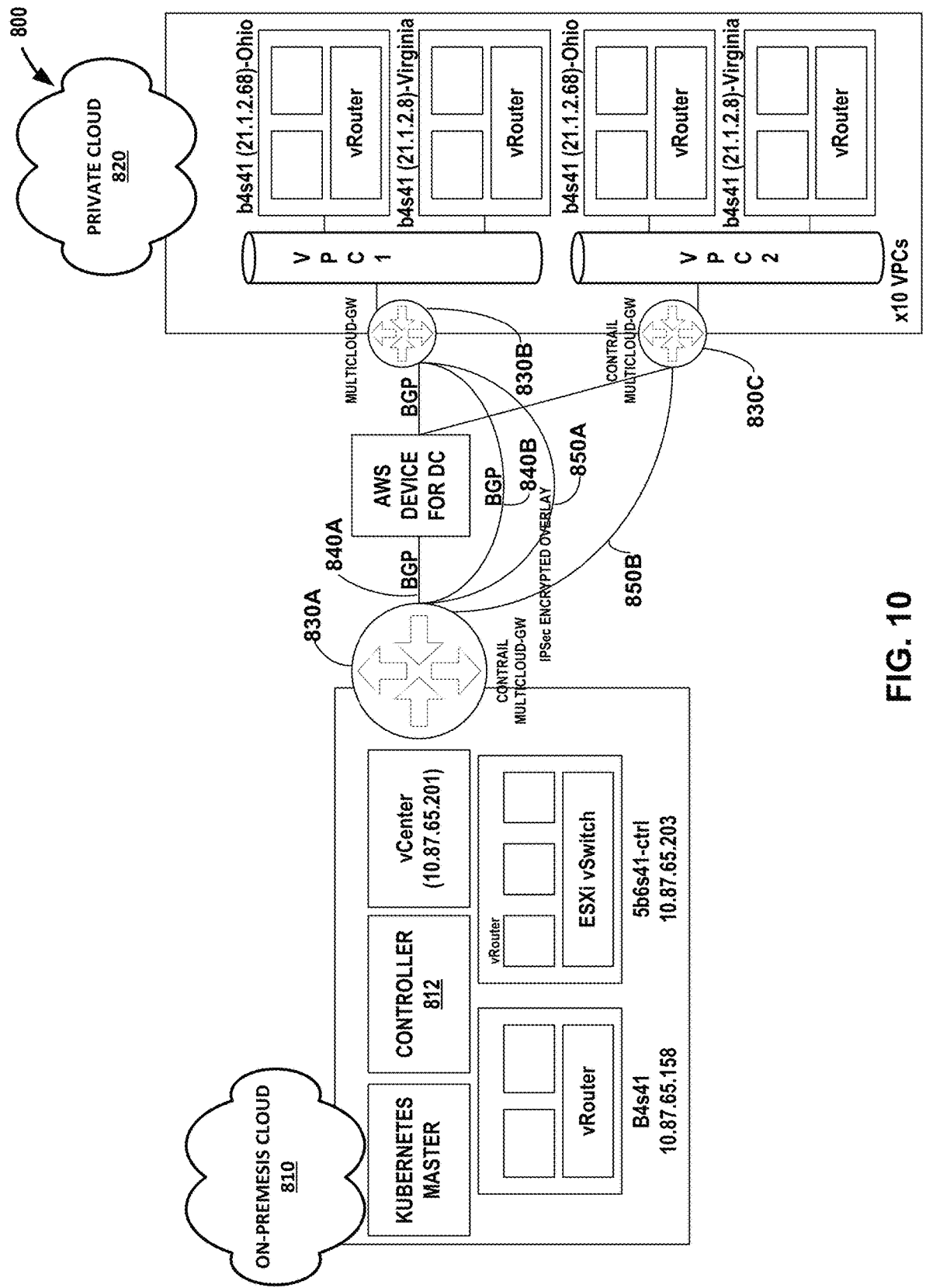
FIG. 10 is a block diagram illustrating another example controller for directing containers within a network, according to techniques described in this disclosure.

FIG. 10 is a block diagram illustrating another example controller for directing containers within a multi-cloud infrastructure 800, according to techniques described in this disclosure. The infrastructure 800 of FIG. 10 includes on-premises cloud 810 and private cloud 820. Controller 812, which is an example of controller 14, may distribute data (e.g., packets, objects, containers, applications, or the like) via gateway portals 830A-830C (collectively, gateway 830, which may be examples of connect gateway routers 18). In some examples, various gateway portals of gateway 830 may be connected using a group of pathways. For example, gateway portal 830A and gateway portal 830B may be connected by a border gateway protocol (BGP) 840A and an Internet Protocol Security (IPSec) Encrypted Overlay channel 850A. BGP is a standardized exterior gateway protocol for exchanging routing and reachability information between servers. For example, a device executing BGP may transmit information required to route packets through one or more routers (e.g., the vRouters of infrastructure 800). BGP sessions may or may not be encrypted. Consequently, it may be beneficial for gateway 830 to include secure channels for transmitting routing information between gateway portals. IPSec encrypted overlay channels 850 may connect gateway portals such that routing information may be transmitted in a secure manner.

Figure 11:
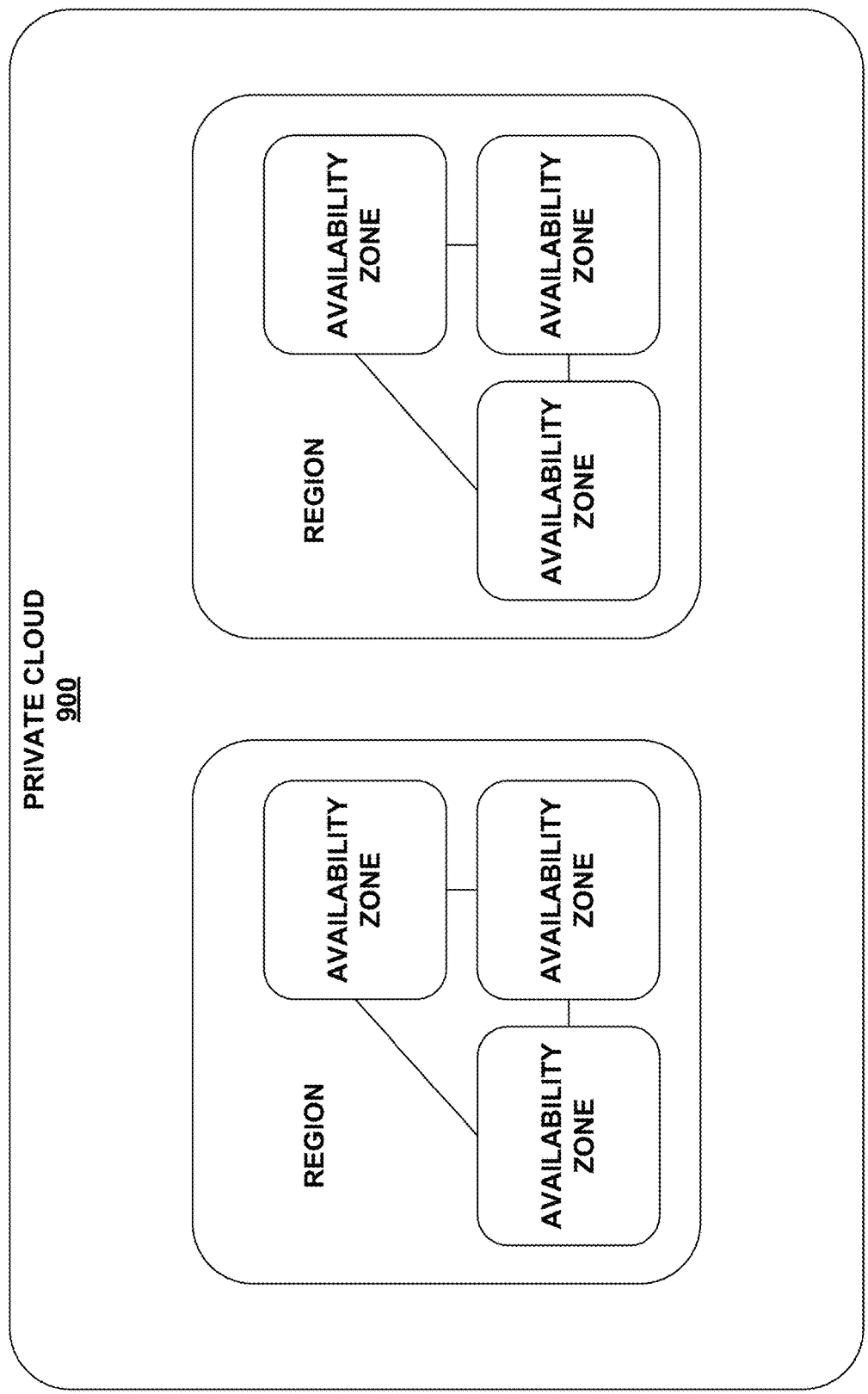
FIG. 11 is a block diagram illustrating an example private cloud including at least one region and at least one availability zone, according to techniques described in this disclosure.

FIG. 11 is a block diagram illustrating an example private cloud 900 including at least one region and at least one availability zone, according to techniques described in this disclosure. Each region of the at least one region includes a geographical area with a collection of availability zones mapped to physical data centers in the respective region. Every region of the at least one region is physically isolated from and independent of every other region of the at least one region in terms of location, power, water supply, etc. An availability zone is a logical data center in a region available for use by customer of private cloud 900. Each availability zone in a region has redundant and separate power, networking and connectivity to reduce the likelihood of two availability zones failing simultaneously.

Figure 12A:
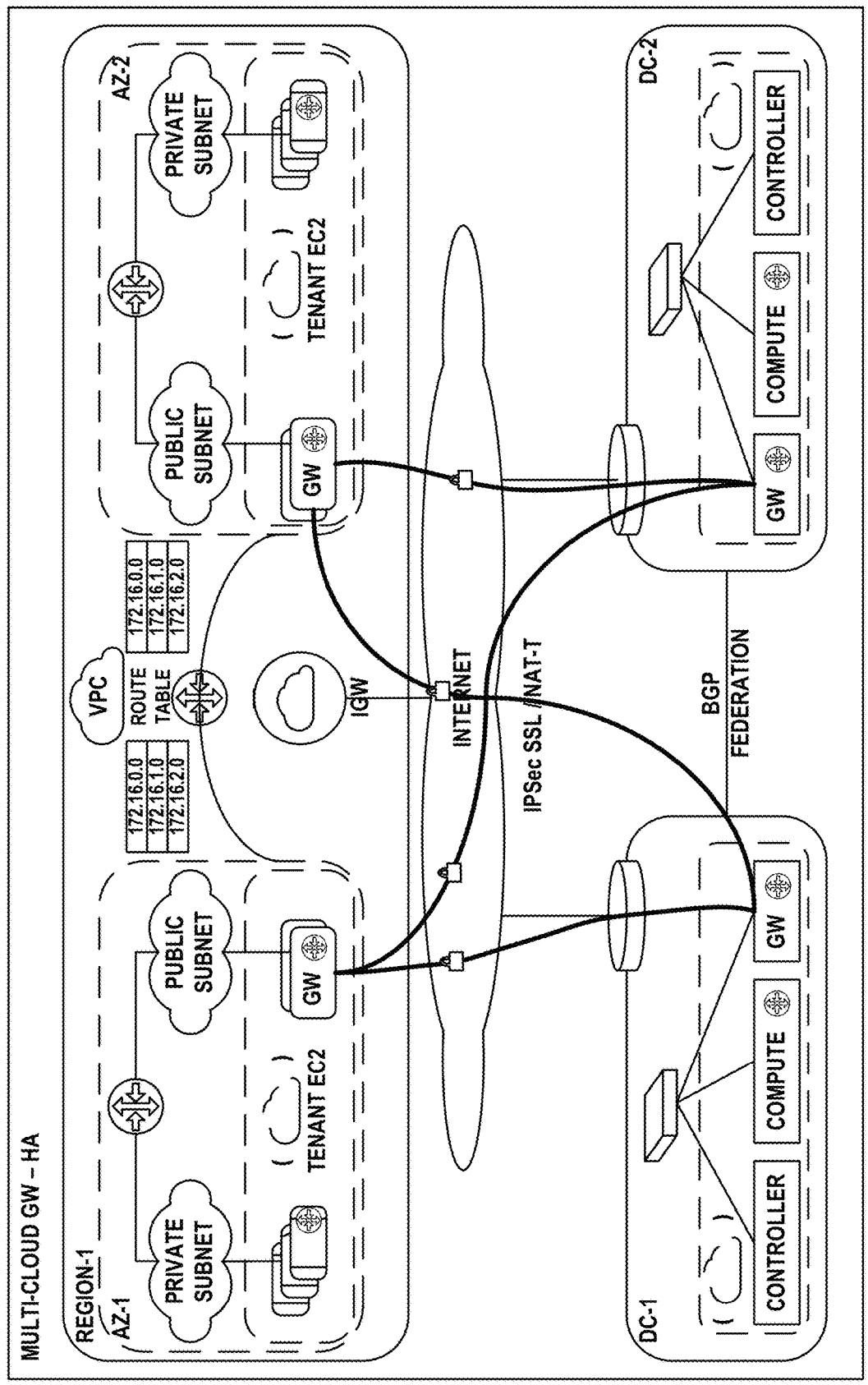
FIGS. 12A-12C are block diagrams illustrating an example system including at least one gateway unit, according to techniques described in this disclosure.
Figure 12B:
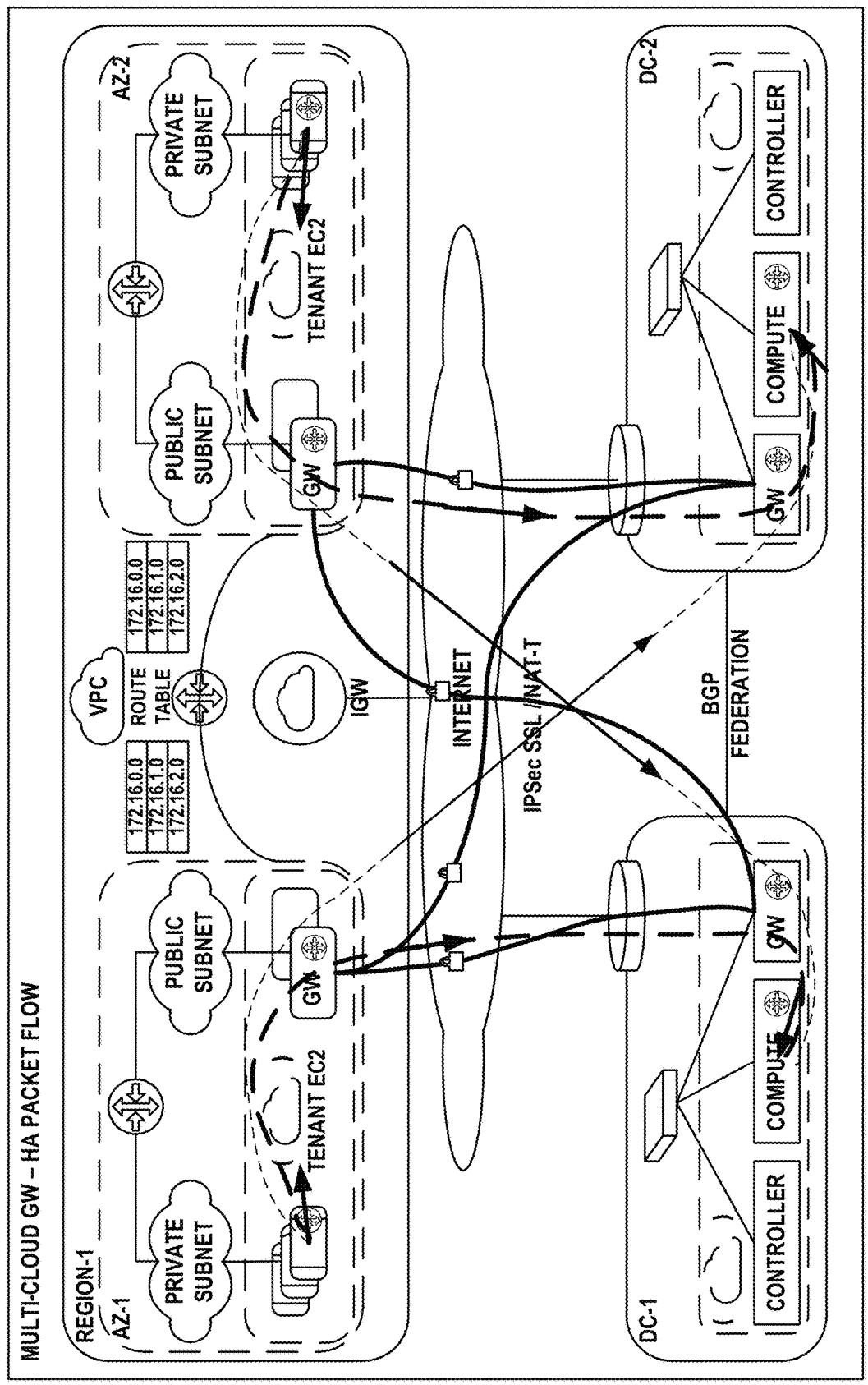
Figure 12C:
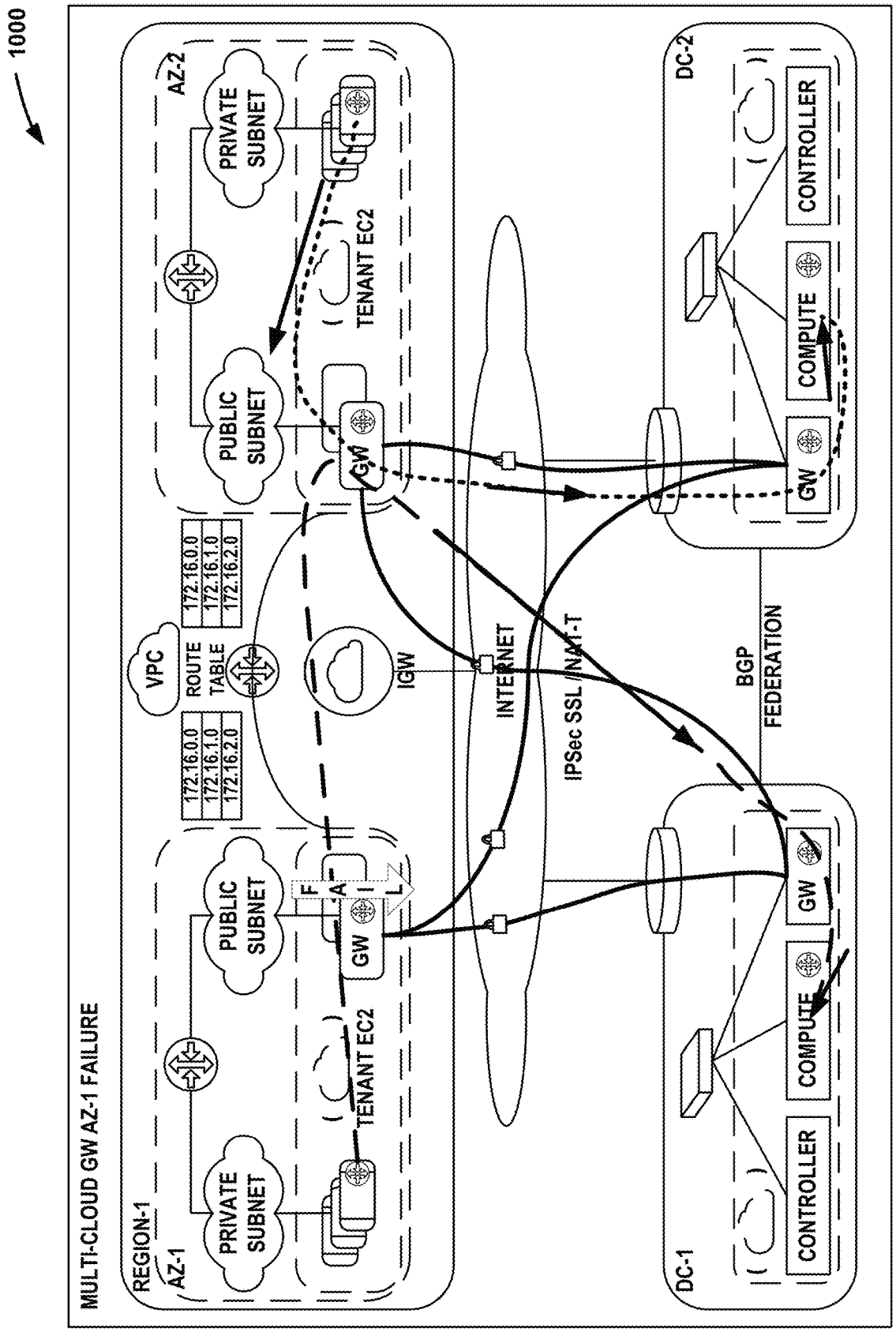

FIGS. 12A-12C are block diagrams illustrating an example network 1000 including at least one gateway portal, according to techniques described in this disclosure. Gateway portals may be located within each availability zone of network 1000. Additionally, controllers configured for building and monitoring computing infrastructures within availability zones including gateway portals. As seen in FIG. 12A, the gateway portals of the availability zones may be configured to communicate with the gateway portals of the controllers via an encrypted channel (an IPSec, a Secure Sockets Layer (SSL), or a network address translator traversal (Nat-t)). As seen in FIG. 23B, when each availability zone (e.g., AZ-1 and AZ-2) is functioning properly, tenant devices within an availability zone (e.g., AZ-1) are configured to transmit and receive information (e.g., packets, containers, or the like) with the controllers and tenant devices in another availability zone (e.g., AZ-2). If an availability zone such as AZ-1 goes offline (FIG. 12C), another availability zone such as AZ-2 may remain online and gateway portals may enable tenant devices within AZ-2 to exchange information with the controllers of DC-1 and DC-2.

In some examples, failures of availability zones may be handled by the gateway. For example, during an instance failure, gateway portals are deployed in active—standby pairs within each availability zone and DC-1 and DC-2. Gateway instance failures will have tunnel routes and next hops advertised to point to the current active gateway portal. In cases where both the gateway instances fail in an availability zone (e.g., AZ-1), then the routes to the gateway instances will be directed via the AZ-2 within the VPC.

Figure 13:
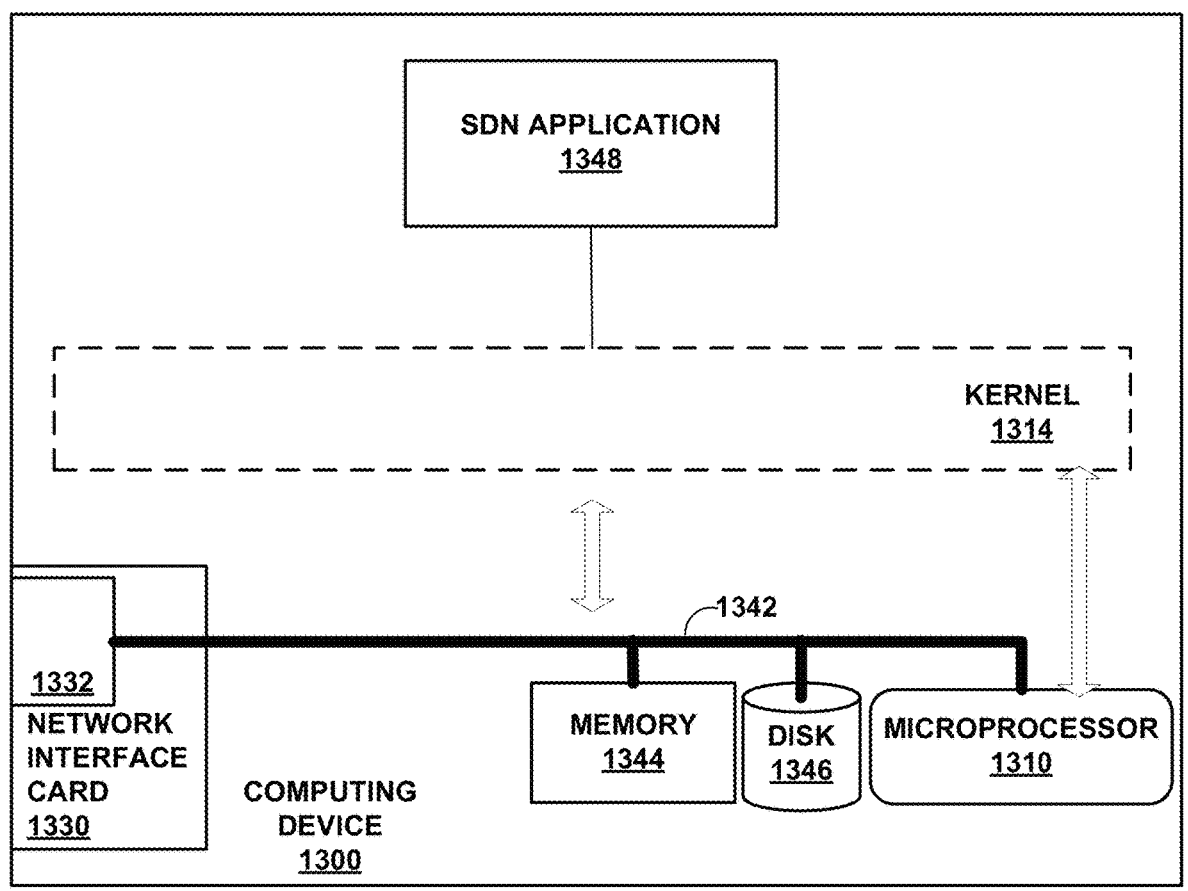
FIG. 13 is a block diagram of an example computing device, according to techniques described in this disclosure.

FIG. 13 is a block diagram of an example computing device, according to techniques described in this disclosure. Computing device 1300 may be an example instance of servers 34 of FIG. 2 for a cloud computing infrastructure. Computing device 1300 may represent one or more real or virtual servers configured to perform operations for an SDN controller 14. Although one example of computing device 1300 is illustrated, it should be understood that SDN controller 14 may be a logically centralized, but physically distributed controller. Hence, SDN controller 14 may execute across one or more computing devices, and computing device 1300 is one example of such computing devices.

Computing device 1300 includes in this example, a bus 1342 coupling hardware components of a computing device 1300 hardware environment. Bus 1342 couples network interface card (NIC) 1330, storage disk 1346, and one or more microprocessors 1310 (hereinafter, "microprocessor 1310"). A front-side bus may in some cases couple microprocessor 1310 and memory device 1344. In some examples, bus 1342 may couple memory device 1344, microprocessor 1310, and NIC 1330. Bus 1342 may represent a Peripheral Component Interface (PCI) express (PCIe) bus. In some examples, a direct memory access (DMA) controller may control DMA transfers among components coupled to bus 1342. In some examples, components coupled to bus 1342 control DMA transfers among components coupled to bus 1342.

Microprocessor 1310 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor). For instance, microprocessor 1310 is an example of processing circuitry on which SDN controller 14 executes.

Disk 1346 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 1310.

Main memory 1344 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 1344 provides a physical address space composed of addressable memory locations.

Network interface card (NIC) 1330 includes one or more interfaces 1332 configured to exchange packets using links of an underlying physical network. Interfaces 1332 may include a port interface card having one or more network ports. NIC 1330 may also include an on-card memory to, e.g., store packet data. Direct memory access transfers between the NIC 1330 and other devices coupled to bus 1342 may read/write from/to the NIC memory.

Memory 1344, NIC 1330, storage disk 1346, and microprocessor 1310 may provide an operating environment for a software stack that includes an operating system kernel 1314 executing in kernel space. Kernel 1314 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 1314 provides an execution environment for one or more processes in a user space.

Computing device 1300 may be coupled to a physical network switch fabric that includes an overlay network that extends switch fabric from physical switches to software or "virtual" routers of physical servers coupled to the switch fabric, such as virtual router 48 of FIG. 2. Computing device 1300 provides an operating environment for SDN application 1348, which may perform operations described above with respect to other instances of SDN controllers described herein. SDN application 1348 represents one or more applications, and SDN application 1348 may execute one or more protocols, such as Simple Network Management Protocol (SNMP) and Netconf. SDN application 1348 may use the one or more protocols to, e.g., establish tunnels 18 and BGP peering sessions over tunnels between connect gateway routers.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

Various examples have been described. These and other examples are within the scope of the following claims.

The invention claimed is:

1. A system comprising:
   a plurality of virtual computing environments (VCEs) in a multi-cloud network;
   a plurality of connect gateway routers, wherein each connect gateway router is associated with a logical endpoint within a logical tunnel mesh for respective VCEs; and
   a single software-defined networking (SDN) controller, executing on processing circuitry, configured to:
      establish the logical tunnel mesh to interconnect the plurality of VCEs in the multi-cloud network via respective connect gateway routers, wherein to establish the logical tunnel mesh, the SDN controller is configured to determine one or more logical tunnels from the logical tunnel mesh to establish one or more communication links between a first VCE and a second VCE of the plurality of VCEs in the multicloud network; and
      advertise the one or more logical tunnels to the first VCE and the second VCE.

2. The system of claim 1, wherein at least one of the VCEs includes a key server configured to generate certificates to be deployed to one or more of the VCEs for encrypted communication.

3. The system of claim 2, wherein the SDN controller is configured to cause the key server to generate certificates during the establishing of the logical tunnel mesh.

4. The system of claim 1, wherein to establish the logical tunnel mesh, the SDN controller is configured to establish Internet Protocol Security (IPSec) sessions between the connect gateway routers of respective VCEs.

5. The system of claim 1, wherein to advertise the one or more logical tunnels, the SDN controller is configured to advertise the one or more logical tunnels via Border Gateway Protocol (BGP).

6. The system of claim 1, further comprising one or more virtual machines executing on one or more servers, wherein the one or more virtual machines form an infrastructure for the first VCE, and wherein at least one of the one or more virtual machines executes a connect gateway router to form the logical endpoint for the first VCE.

7. The system of claim 6, wherein the one or more virtual machines comprise a first set of one or more virtual machines, the one or more servers comprise a first set of one or more servers, and the connect gateway router comprises a first connect gateway router, the system further comprising a second set of one or more virtual machines executing on a second set of one or more servers, wherein the second set of one or more virtual machines form an infrastructure for the second VCE, wherein at least one of the second set of one or more virtual machines executes a second connect gateway router to form the logical endpoint for the second VCE, and wherein the SDN controller is configured to establish a logical tunnel of the logical tunnel mesh that interconnects the first connect gateway router and the second connect gateway router.

8. A method comprising:
   establishing, with a single software-defined networking (SDN) controller executing on processing circuitry, a logical tunnel mesh to interconnect a plurality of virtual computing environments (VCEs) in a multi-cloud network via respective connect gateway routers, wherein each connect gateway router is associated with a logical endpoint within a logical tunnel mesh for respective VCEs, and wherein establishing the logical tunnel mesh comprises determining one or more logical tunnels from the logical tunnel mesh to establish one or more communication links between a first VCE and a second VCE of the plurality of VCEs in the multi-cloud network; and
   advertising the one or more logical tunnels to the first VCE and the second VCE.

9. The method of claim 8, further comprising generating certificates, via a key server in at least one of the VCEs, to be deployed to one or more of the VCEs for encrypted communication.

10. The method of claim 9, further comprising causing, with the SDN controller, the key server to generate certificates during the establishing of the logical tunnel mesh.

11. The method of claim 8, wherein establishing the logical tunnel mesh comprises establishing Internet Protocol Security (IPSec) sessions between the connect gateway routers of respective VCEs.

12. The method of claim 8, wherein advertising the one or more logical tunnels comprises advertising the one or more logical tunnels via Border Gateway Protocol (BGP).

13. The method of claim 8, further comprising:
   executing one or more virtual machines on one more servers, wherein the one or more virtual machines form an infrastructure for the first VCE; and
   executing a connect gateway router on at least one of the one or more virtual machines to form the logical endpoint for the first VCE.

14. The method of claim 13, wherein the one or more virtual machines comprise a first set of one or more virtual machines, the one or more servers comprise a first set of one or more servers, and the connect gateway router comprises a first connect gateway router, the method further comprising:
   executing a second set of one or more virtual machines on a second set of one or more servers, wherein the second set of one or more virtual machines form an infrastructure for the second VCE;
   executing a second connect gateway router on at least one of the second set of one or more virtual machines to form the logical endpoint for the second VCE; and
   establishing a logical tunnel of the logical tunnel mesh that interconnects the first connect gateway router and the second connect gateway router.

15. A computer-readable storage medium storing instructions thereon that when executed cause one or more processors, via execution of a single software-defined networking (SDN) controller, to:
   establish, by execution of the SDN controller, a logical tunnel mesh to interconnect a plurality of virtual computing environments (VCEs) in a multi-cloud network via respective connect gateway routers, wherein each connect gateway router is associated with a logical endpoint within a logical tunnel mesh for respective VCEs, and wherein the instructions that cause the one or more processors, via execution of the SDN controller, to establish the logical tunnel mesh comprise instructions that cause the one or more processors, via execution of the SDN controller, to determine one or more logical tunnels from the logical tunnel mesh to establish one or more communication links between a first VCE and a second VCE of the plurality of VCEs in the multi-cloud network; and
   advertise the one or more logical tunnels to the first VCE and the second VCE.

16. The computer-readable storage medium of claim 15, further comprising instructions that cause the one or more processors, via execution of the SDN controller to, generate certificates, via a key server in at least one of the VCEs, to be deployed to one or more of the VCEs for encrypted communication.

17. The computer-readable storage medium of claim 16, further comprising instructions that cause the one or more processors, via execution of the SDN controller to, cause the key server to generate certificates during the establishing of the logical tunnel mesh.

18. The computer-readable storage medium of claim 15, wherein the instructions that cause the one or more processors, via execution of the SDN controller, to establish the logical tunnel mesh comprise instructions that cause the one or more processors, via execution of the SDN controller to, establish Internet Protocol Security (IPSec) sessions between the connect gateway routers of respective VCEs.

19. The computer-readable storage medium of claim 15, wherein the instructions that cause the one or more processors, via execution of the SDN controller, to advertise the one or more logical tunnels comprise instructions that cause the one or more processors, via execution of the SDN controller, to advertise the one or more logical tunnels via Border Gateway Protocol (BGP).

20. The computer-readable storage medium of claim 15, further comprising instructions that cause the one or more processors, via execution of the SDN controller, to:
  execute one or more virtual machines on one more servers, wherein the one or more virtual machines form an infrastructure for the first VCE; and
  execute a connect gateway router on at least one of the one or more virtual machines to form the logical endpoint for the first VCE.

* * * * *